United States Patent [19]

Heckmann

[11] Patent Number: 4,627,591
[45] Date of Patent: Dec. 9, 1986

[54] ADJUSTABLE LEGS FOR FURNITURE AND LOCKING MEANS FOR SECURING SUCH ADJUSTMENT

[76] Inventor: Peter Heckmann, Stangenstrasse 20, 7022 Leinfelden-Echterdingen, Fed. Rep. of Germany

[21] Appl. No.: 670,980

[22] Filed: Nov. 13, 1984

[30] Foreign Application Priority Data

Nov. 12, 1983 [DE] Fed. Rep. of Germany ....... 3341088

[51] Int. Cl.$^4$ ............................................. F16M 11/00
[52] U.S. Cl. ................................... 248/411; 108/148; 248/188.5
[58] Field of Search ...................... 248/404, 161, 162.1, 248/411, 410, 414, 188.5; 108/146, 148

[56] References Cited

U.S. PATENT DOCUMENTS

| | | | |
|---|---|---|---|
| 197,707 | 11/1877 | Wilkerson | 248/161 |
| 3,113,793 | 12/1963 | Harwood | 248/161 X |
| 3,885,764 | 5/1975 | Pabreza | 248/162.1 |
| 4,360,180 | 11/1982 | Bruneau | 108/146 X |

FOREIGN PATENT DOCUMENTS 2406338 8/1975 Fed. Rep. of Germany .
2607144 8/1977 Fed. Rep. of Germany .
1101248 10/1955 France .................. 248/161

Primary Examiner—J. Franklin Foss
Assistant Examiner—David L. Talbott
Attorney, Agent, or Firm—Burns, Doane, Swecker & Mathis

[57] ABSTRACT

In furniture having vertically adjustable legs, the legs comprise inner and outer telescoping leg segments which are relatively vertically movable. The inner leg segment carries brake shoes which are movable transversely relative to the longitudinal axis of the inner leg segment. A pair of levers are disposed within the inner leg segment and are swingable about a common transverse axle so as to selectively lengthen and shorten the effective transverse dimension of the levers. Outer ends of the levers bear against respective brake shoes, such that when the effective transverse dimension of the levers is lengthened, the brake shoes are pushed outwardly into frictional engagement with the outer leg segment to prevent movement of the latter. When that effective transverse dimension is shortened, the brake shoes are retracted to release the outer leg segment for movement.

7 Claims, 7 Drawing Figures

ADJUSTABLE LEGS FOR FURNITURE AND LOCKING MEANS FOR SECURING SUCH ADJUSTMENT

BACKGROUND AND OBJECTS OF THE INVENTION

The invention relates to a locking device for telescoping legs of furniture items such as tables or chairs, which are adjustable in height.

Adjustable telescoping legs are used in particular in office chairs. Usually, the outer leg is in the form of an upright tube, connected at its lower end with support means, such as for example, arms diverging in the shape of a star, while the inner telescoping tube is connected with the seating surface or, in the case of tables, with the table top. The inner telescoping tube slides in the outer telescope tube, so that adjustment in height is possible.

To secure the seating or working position desired, it is necessary to immobilize the inner telescope tube in a certain vertical position in relation to the outer telescope tube. Locking devices of varied designs are used for that purpose. Following the release of such a device, the inner telescope tube and thus the seat or working plate slides downward by gravity and must then be manually adjusted to the desired height. The height selected is then immobilized by the actuation of the locking device. In more advanced designs, additionally a load compensation means in the form, for example of a spring (such as a helical spring or a gas spring) is provided, which applies an upwardly directed force longitudinally to the inner telescoping tube. The magnitude of the force of this spring may be such that the inner telescoping tube is always moving in the upward direction, when the locking device is released. This configuration is especially preferred in office chairs. The correct seating position is then attained by loading the seating surface and locking it at the correct height, but the force of the spring acting on the inner telescoping tube may also be such that it just compensates for the weight of the seating or working surface. It is then possible to adjust the height without the use of any appreciable force. A spring setting of this type is used in particular with greater weights of the seating or working surface, preferably with tables.

Different configurations for the mutual immobilization of the position of the telescoping legs have already been proposed. For example, German DE-OS No. 26 07 144 proposes to apply a corrugation over a certain area of the outer tube. Projections of a clamping sleeve engage the beads of the corrugated tube, the sleeve being expanded by a conical inner telescoping tube. By sliding the clamping sleeve along the cone, the projections may be released from the beads so that an adjustment in height becomes possible. The sliding of the clamping device is effected by an adjusting rod under spring pressure extending axially within the inner telescoping tube, the rod being, in turn, actuated by an elbowed lever.

With a height adjusting device of this type, no continuous height adjustment is possible, as the projections of the clamping sleeve permit locking only if they are abutting against the corresponding beads of the outer corrugated tube. The corrugation of the outer tube further results in an unfavorable aesthetic appearance.

Another locking device of the afore-mentioned type is described in German DE-OS No. 24 06 338. There, a rod-shaped or tubular body is provided in the inner tube, which at its lower end terminates in a cone. A plurality of radial bores is provided at the lower end of the inner pipe in which balls are located. The cone of the cylindrical body presses these balls against the outer tube. The immobilization obtained in this manner may be released by axial movements of the cylindrical body or of the inner telescope tube, whereby the balls slide along the surface of the cone.

Adjusting devices of this type are structurally expensive in view of the additional cylindrical body and the balls used, including their bearings. Furthermore, the frictional joint by means of balls may be exposed to limited loads in one direction only, which is especially disadvantageous, if for example, a table top is being pressured upwards by a spring, resulting in stresses in both directions. This adjusting device may thus be applied only to layouts without spring powered load compensations, for example, a simple chair. It is not applicable to an arrangement with load compensation.

It is an object of the present invention to eliminate the disadvantages of the known configurations and to provide a locking device that is mechanically simple, may be loaded heavily, and permits continuous height adjustments.

SUMMARY OF THE INVENTION

This object is attained according to the invention wherein inside the inner tube a knee lever arrangement is provided which in the locking position presses at least one brake shoe through a corresponding opening of the inner tube and against the outer tube. The lever may be released by pivoting about an axis oriented transversley of the longitudinal axis of the inner tube. The use of brake shoes assures a high coefficient of friction so that the telescoping tubes may be loaded heavily in both directions. The employment of a knee lever to pressure the brake shoe(s) against the outer tube is structurally simple. The locking effect may be cancelled simply by pivoting the knee levers in relation to the inner tube. Continuous adjustments are readily possible and may be effected without an appreciable use of force.

Two knee levers may be provided and supported at a common point of rotation on an axle displaceable in the longitudinal direction of the inner tube. In this case, the position of this axle defines the force applied by the knee levers on the brake shoes. The locking device can therefore be released or locked by means of the displacement of the axle in the longitudinal direction of the telescoping tubes.

The axle can be mounted in a body displaceably guided within the inner tube. In this case, the release or locking of the immobilizing device may be effected by the displacement of this body in the longitudinal direction of the telescope tubes, as the body guides the axle of the knee levers accordingly.

To position the axle of the knee levers (or the body guiding the axle), a spring element is provided, which acts in the longitudinal direction of the inner tube to press the axle (or the body) into the locking position. The axle (or the body) are pressured in the non-actuated state always into a position wherein the knee levers are spread to the maximum or near maximum transverse extent, thereby providing a maximum braking effect. A spring element, preferably a helical spring is used, although other types of spring elements may also be used.

To release the locking device, the axle or the body must be expossed to a force acting against the spring force, thereby rendering the tilting of the knee levers possible. According to an advantageous further development of the invention, a rod or the like axially displaceable in the inner pipe is provided, the rod abutting against the axle (or the body) and being capable of releasing it from its locking position by an application of force in the direction opposing the force of the spring element. An axial displacement of the rod thus effects the release or immobilization of the locking device.

It is advantageous further to provide a two-arm lever to actuate the rod. This two-arm lever is supported on the inner tube, preferably just under the seating or working surface of the item of furniture. Its outwardly protruding end serves to manually actuate the locking device and is therefore usually equipped with a handle or the like, while its inner end is brought into contact upon actuation with the rod and is applying to the latter the force required for release of the locking device.

Good functioning of the knee levers and a satisfactory transmission of force from the knee levers to the brake shoes may be obtained by providing their sides facing the brake shoes with points engaging corresponding cones in the brake shoes. It is advantageous further to pivotally connect the knee levers to the brake shoes.

THE DRAWING

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
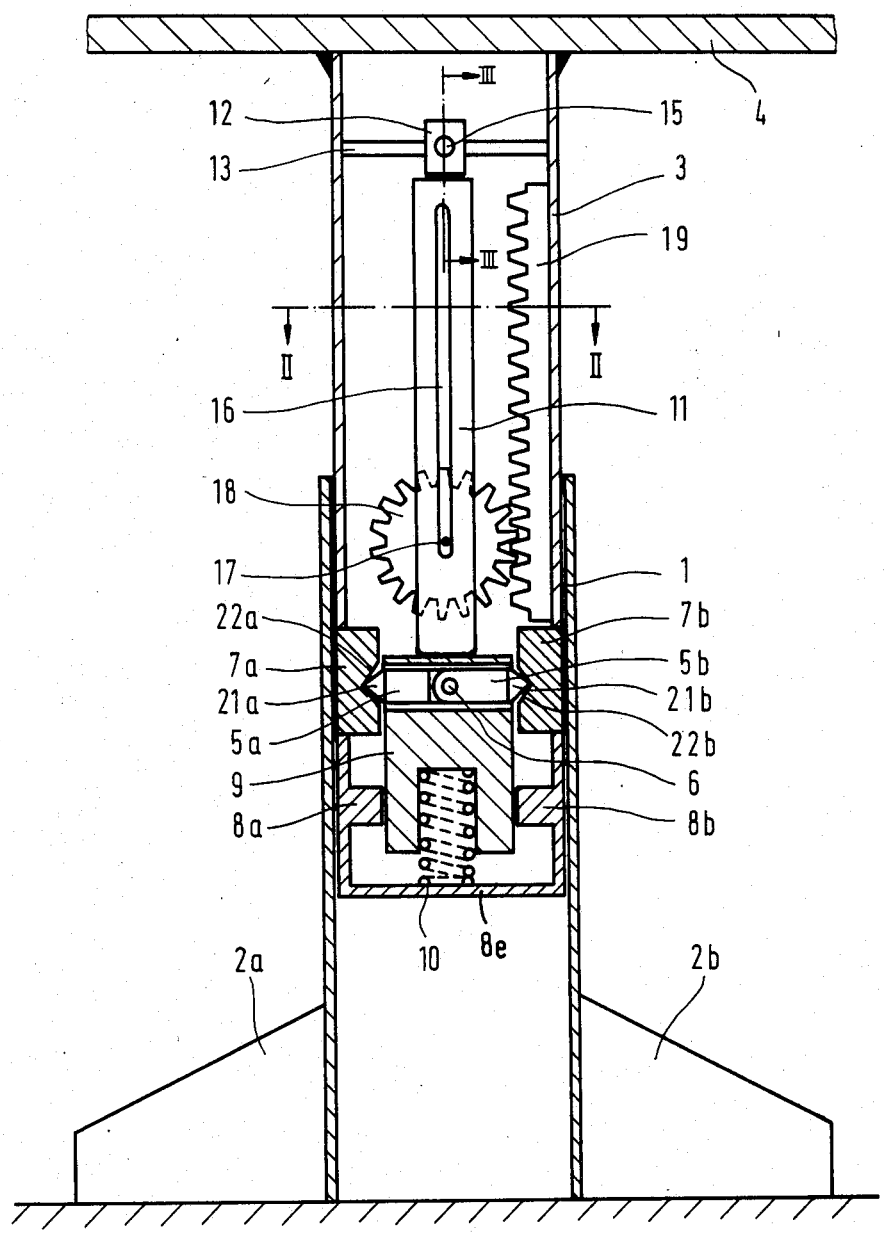
FIG. 1 shows, in side elevation and vertical section, a height adjustable table equipped with a locking device immobilized.
Figure 2:
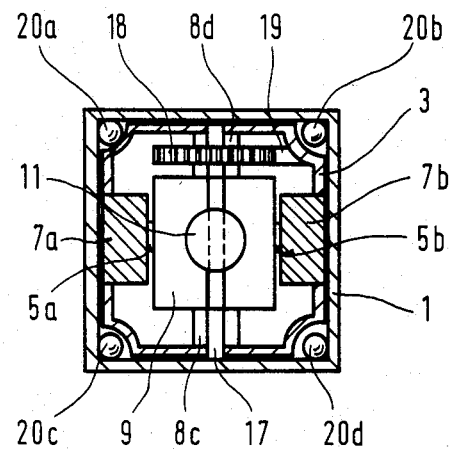
FIG. 2 is a cross-section taken along line II—II of FIG. 1.

FIG. 1 shows a cross-section through a height adjustable table; for reasons of clarity the dimensions along the vertical and horizontal axes have been drawn to different scales. The adjustment is effected by means of two telescoping leg segments 1, 3 of tubular configuration. The outer leg segment 1 serves as a support and is connected with two feet 2a and 2b. The inner leg segment 3 is axially displaceable in relation to the outer leg segment 1 and carries on its upper end a table top 4, shown only partially. The outer and inner leg segments in principle may have any cross-section, for example, circular or rectangular. In the disclosed preferred embodiment shown, as seen in FIG. 2, a square cross-section was chosen.

The inner and outer leg segments are guided slidingly relative to each other. It is, however, advantageous especially in case of a heavy table top 4, to provide roller bearings to facilitate such sliding. It is seen in FIG. 2 that for this purpose balls 20a–d are located in the inner leg segment to roll on the inside of the outer leg segment.

Figure 4:
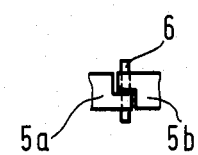
FIG. 4 is a fragmentary view depicting the interconnection of the two knee levers on a common axle.

To lock-in a certain height adjustment of the table top 4, knee levers 5a and 5b are provided, which as seen in FIG. 4, have a common axle 6 and press two brake shoes 7a and 7b through openings in the inner leg segment and against the outer leg segment 1. The levers 5a, 5b are oriented perpendicularly relative to the inner surface of the outer leg segment against which the brake shoes bear, as is clearly depicted in FIG. 1. With an arrangement of this type, very high friction coefficients may be obtained between the brake shoes and the outer leg segment, so that the locking device functions reliably even under high loads, for example, in the case of a marble table top.

Figure 3:
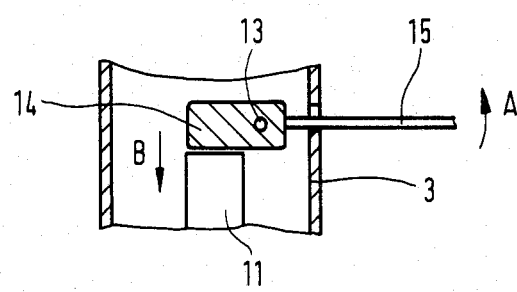
FIG. 3 is a cross-section taken along line III—III of FIG. 1.

To release the locking device it is merely necessary to displace the axle 6 of the knee levers in the direction of the telescope legs. It would be possible, for example, to provide a fork applied to the ends of the axle 6 protruding past the knee levers. However, in the disclosed preferred embodiment a different solution has been chosen. There, a body 9 longitudinally displaceable in axial guides of the inner leg segment 3 is provided. The body is equipped with bores wherein the outer ends of the axle 6 are bearingly supported. The force of a helical spring 10 acts on the body to urge the body 9 (as seen in FIG. 1) into an upper terminal position. In this upper terminal position the knee levers are spead so that a maximum braking effect is obtained. The upper terminal position is defined by a stop which prevents any further motion of the body 9 in the upward position. In that regard, it would be possible in principle to provide, for example, on the inner leg segment 3, a plurality of stop elements limiting the stroke of the body 9. In the disclosed preferred embodiment, that stop element comprises a rod 11, which in turn, abuts against a two arm lever 12. This two arm lever 12 is seated on a shaft 13 bearingly supported on the inner leg segment 3. One arm 14 of the lever (FIG. 3) is in contact inside the inner leg segment 3 with the rod 11, while the other arm 15 is protruding to the outside through an opening in the inner leg segment 3, where it is equipped with a handle or the like (not shown). The arm 15 abuts against the lower edge of the opening provided in the leg segment 3 and thus simultaneously forms, by way of the rod 11, a stop for the body 9. A lower stop for the body 9 is provided by a bottom surface 8e of the inner leg segment 3.

The rod 11 has a slot-like opening 16, through which the axle 17 of a toothed gear 18 is passing. The axle 17 passes through further slot like-openings of the inner leg segment 3 and is bearingly supported on or fastened to the outer leg segment 1. A spring (not shown) applies a torque (in the counter clockwise direction as viewed in the direction of FIG. 1) to the tooth gear 18. The gear 18 engages a rack 19 fastened to the inner leg segment 3. Following the release of the locking device 5a, 5b the gear 18 applies an upwardly directed force to the inner leg segment 3. This force is opposed to the direction of the load effect of the table top 4 and thereby facilitates adjustment in height following the release of the locking device. The force applied by the gear 18 may be of such strength, for example, that the table top 4 travels upward after the release of the locking device. In that case, the table top can be moved down by a slight pressure from above into the position desired and immobilized therein.

It is highly advantageous, however, to have the force applied by the gear 18 correspond directly to the weight of the table top 4. Following the release of the locking device, the table top 4 then does not move under its own weight and may be moved up or down by very little external force.

In actual practice, the rod 11 must naturally be guided in the axial direction. For the sake of clarity, these axial guides are not shown in the drawing.

The ends of the knee levers 5a and 5b facing the brake shoes are equipped preferably with points 21a and 21b engaging cones 22a and 22b of the brake shoes 7a and 7b. This configuration results in an effective transfer of forces to the brake shoes and an easy tilting of the knee levers.

In FIG. 2, in addition to the individual parts explained in FIG. 1, two further axial guides 8c and 8d for the body 9 are shown. Furthermore, the balls 20a to 20d are shown in the figure; they roll on the inside of the outer leg segment 1.

Figure 5:
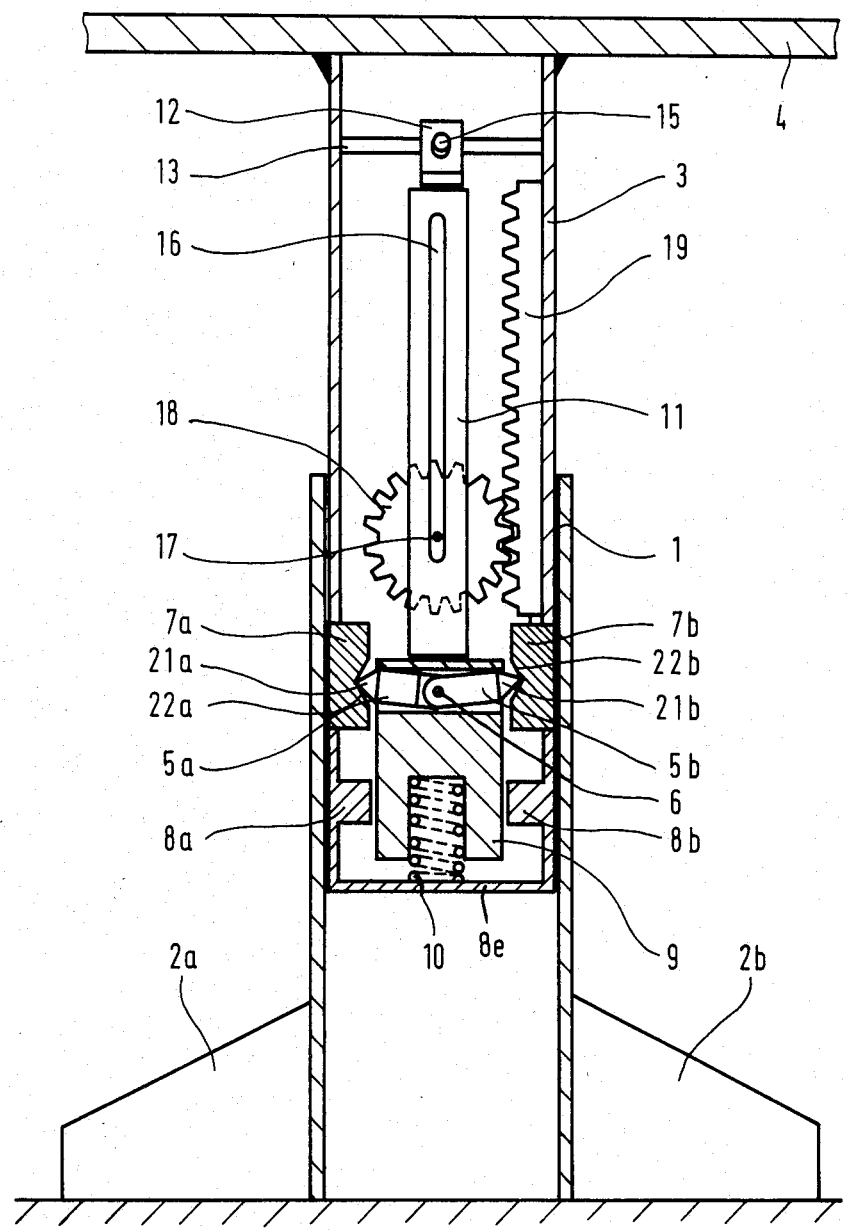
FIG. 5 is a view similar to FIG. 1, with the locking device released.

The adjustment of the table is thus effected as follows: The user applies a force in the direction of the arrow A (FIG. 3) to the arm 15 of the two arm lever 12. The other arm 14 of the lever 12 then moves in the direction of the arrow B downward. This downward motion is transferred to the rod 11, which presses the body 9 against the force of the helical spring 10 downward. The axle 6 of the knee levers follows this downward movement. The knee levers 5a and 5b have now been retracted and occupy the position shown in FIG. 5, i.e., their edges facing the brake shoes are pointing upward. The effective transverse dimension of the knee levers is thus reduced, whereby the brake shoes 7a and 7b are no longer under pressure, so the locking device is released. The table top 14 may now be moved up or down, but from the position of FIG. 1 only downward. The force transmitted by the gear 18 to the rack 19 holds the table top in equilibrium so that its position may be adjusted almost without effort. This is especially important if the table top has a considerable weight.

Figure 6:
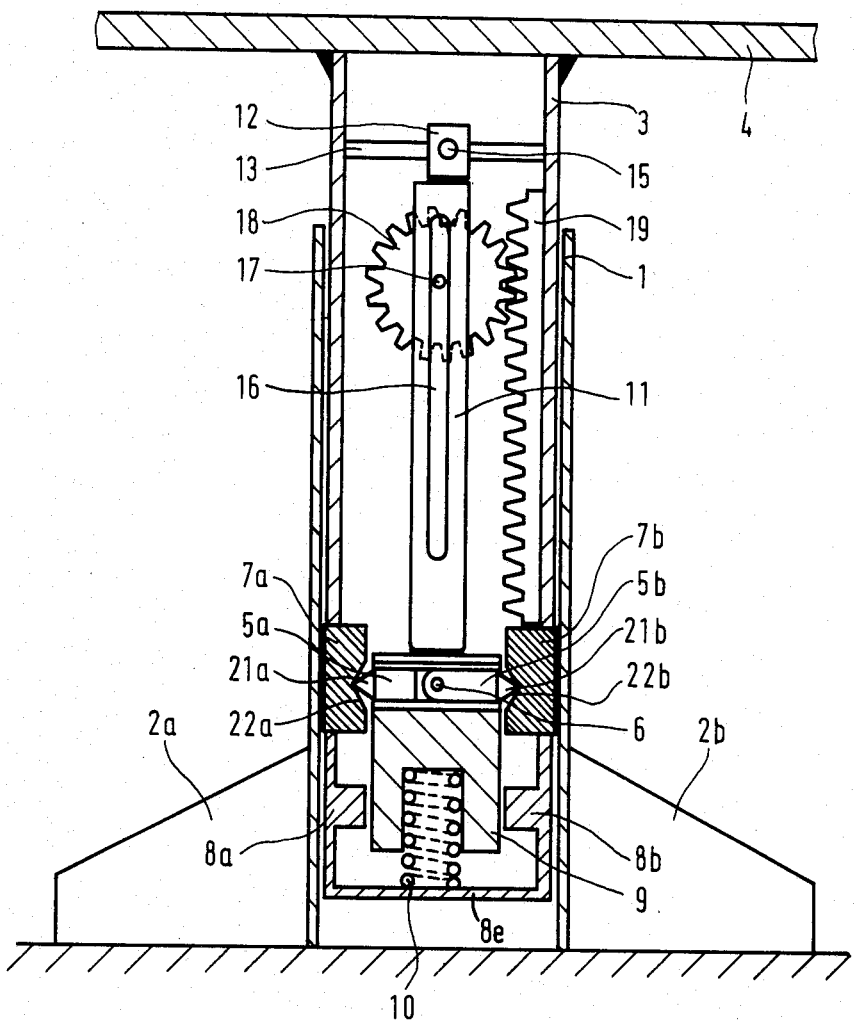
FIG. 6 is a view similar to FIG. 1 with the table in a downwardmost position with an immobilized locking device.

In FIG. 6, the table top has been moved almost entirely down. If the arm 15 of the lever 12 is then released, the body 9 returns upwardly to its original position under the effect of the spring 10. In the process, the knee levers are spread and press the brake shoes 7a and 7b again against the outer leg segment, so that the locking device is immobilized (this state is shown in FIG. 6). In the locked condition, the brake effect is approximately the same in the upward and downward directions.

It should be mentioned further that the body 9 and the rod 11 may comprise a single piece. The compression spring 10 may also be replaced without difficulty by an appropriate structural element, for example, a tension spring attached to the lever 15 if the body 9 and the rod 11 are of a single piece.

Figure 7:
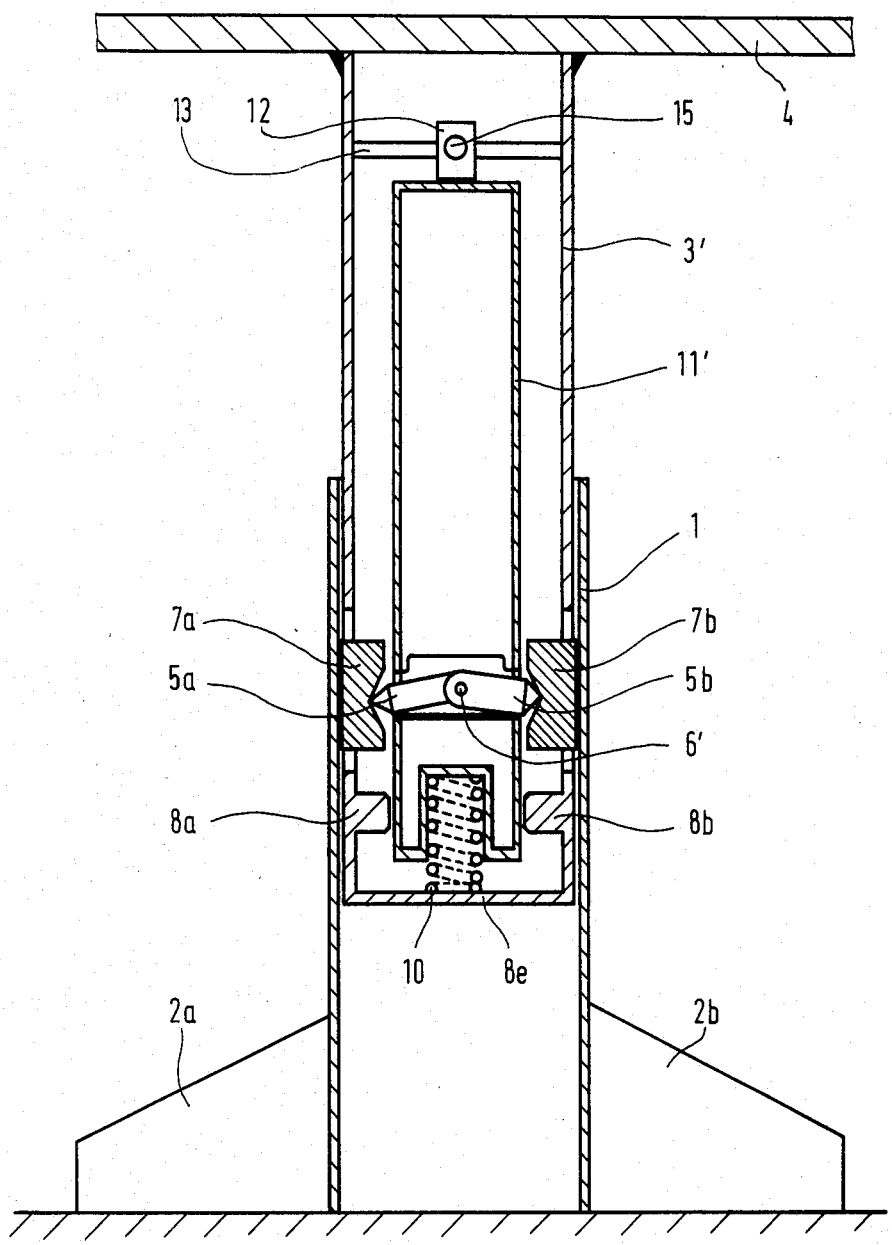
FIG. 7 is a view similar to FIG. 1 of another preferred embodiment of the invention with the table in an upward position and the locking device released.

A further embodiment of the invention is shown in FIG. 7. In this embodiment the knee lever axle 6' is no longer moving freely nor is supported on a body, but is secured to or bearingly supported on the inner leg segment 3' (a guide body is not provided). The compression spring 10 acts directly on the guide part 11' and therefore urges the guide part in the upward direction. The guide part 11' acts on the knee levers 5a and 5b at a certain distance from the point of rotation and spreads them apart. The knee levers thus press against the brake shoes 7a and 7b and urge them against the outer leg segment 1. If the lock is to be released, the lever 12 is tilted as in the example of FIGS. 1 to 6, i.e., the arm 15 is tilted upward, whereby the arm 14 (not shown) of this lever is applying a downward force on the guide part 11'. The latter is now moving downward, so that the outer ends of the knee levers 5a and 5b are pivoted in the downward direction (the rotating axle of the knee levers 6' does not move in the axial direction, as it is fastened to or supported on the inner leg segment 3'). By means of the stronger tilting of the knee levers the force on the brake shoes 7a and 7b is cancelled out so that the table may be adjusted in height.

This embodiment provides an adequate brake effect to hold the table top 4 even under load. The brake effect in the other direction (i.e., upward),is not as preferable as in the first form of the embodiment so that it is used mainly in cases wherein no load equalization by a spring is provided (as shown in the example of FIG. 7). It is possible, however, to make the brake shoes of rubber. With rubber brake shoes of this type an adequate brake effect may be obtained in both directions, so that their use is possible even in furniture pieces with load equalization by springs. In the embodiment according to FIG. 7, it should be mentioned that the cut-outs provided for the brake shoes 7a and 7b in the inner pipe 3' must be appreciably larger than in the first example, as the brake shoes are moving slightly in the axial direction when locking or releasing.

Although the present invention has been described in connection with preferred embodiments thereof, it will be appreciated by those skilled in the art that additions, modifications, substitutions and deletions not specifically described, may be made without departing from the spirit and scope of the invention as defined in the appended claims.

What is claimed is:

1. In furniture of the type having leg means of adjustable height, said leg means comprising:
    an outer leg segment having an inner surface,
    an inner leg segment telescopingly received in said outer leg segment for vertical movement relative to said outer leg segment so that said inner leg segment is vertically adjustable,
    locking means disposed within and carried by said inner leg segment for securing said inner leg segment in adjusted vertical relationships, said locking means comprising
        first and second brake shoes mounted on said inner leg segment and arranged for movement transversely of a longitudinal axis of said inner leg segment to project through opening means in said inner leg segment,
        a body carried by said inner leg segment for movement therewith,
        first and second levers pivotably connected to said body by a horizontal pivot axle common to both said levers, said first and second levers being engageable with said first and second brake shoes, respectively, such that said first and second levers can be oriented horizontally to exert forces against respective ones of said first and second brake shoes in a direction oriented perpendicularly to said inner surface of said outer leg segment to press said brake shoes against said inner surface, said first and second levers being swingable relative to said inner leg segment and out of said horizontal orientation for shortening the effective transverse dimension of said levers to enable said brake shoes to be retracted away from said inner surface, spring means for yieldably biasing said body toward a position in which said first and second levers are horizontally oriented to press said brake shoes against said inner surface, and release means carried by said inner leg segment for displacing said body longitudinally against the bias of said spring means to move said levers out of said horizontally oriented position.

2. Apparatus according to claim 1, wherein said release means comprises a rod longitudinally displaceable within said inner leg segment for displacing said body longitudinally against said spring force.

3. Apparatus according to claim 2, wherein said release means further comprises a first lever arm operably connected to said rod and a second manually actuable lever arm operably attached to said first lever arm such that actuation of said second lever arm produces movement of said first lever arm and said rod.

4. Apparatus according to claim 1, wherein said brake shoes are formed of rubber.

5. Apparatus according to claim 1, wherein said levers are each pointed at ends thereof which abut said brake shoes, the latter including generally conical recesses receiving said pointed ends.

6. Apparatus according to claim 1, wherein said levers are pivotably connected to said brake shoes.

7. Apparatus according to claim 1 including means for urging said leg segments outwardly apart when said brake shoe means has been retracted, to counteract at least some of the weight of the furniture carried by said leg means.

* * * * *